United States Patent
Duval

(10) Patent No.: US 8,508,932 B2
(45) Date of Patent: Aug. 13, 2013

(54) DOCKING STATION

(75) Inventor: Christopher Duval, Rancho Santa Margarita, CA (US)

(73) Assignee: Magnadyne Corporation, Compton, CA (US)

( * ) Notice: Subject to any disclaimer, the term of this patent is extended or adjusted under 35 U.S.C. 154(b) by 282 days.

(21) Appl. No.: 13/093,607

(22) Filed: Apr. 25, 2011

(65) Prior Publication Data
US 2012/0100815 A1    Apr. 26, 2012

Related U.S. Application Data

(60) Provisional application No. 61/327,620, filed on Apr. 23, 2010.

(51) Int. Cl.
*H05K 5/00* (2006.01)

(52) U.S. Cl.
USPC ................................................... 361/679.41

(58) Field of Classification Search
None
See application file for complete search history.

(56) References Cited

U.S. PATENT DOCUMENTS

| | | | |
|---|---|---|---|
| 5,859,762 A * | 1/1999 | Clark et al. | 361/679.41 |
| 6,256,193 B1 * | 7/2001 | Janik et al. | 361/679.59 |
| 7,084,932 B1 * | 8/2006 | Mathias et al. | 348/837 |
| 7,158,377 B2 * | 1/2007 | Mecca et al. | 361/679.23 |
| 7,236,863 B2 * | 6/2007 | LaPorte et al. | 701/36 |
| 7,490,887 B2 * | 2/2009 | Vitito | 296/37.8 |
| 7,778,026 B2 * | 8/2010 | Mitchell | 361/679.55 |
| 8,159,623 B2 * | 4/2012 | Strohmaier et al. | 348/836 |
| 8,191,838 B2 * | 6/2012 | Carter | 248/188.6 |
| 2004/0061995 A1 * | 4/2004 | McMahon | 361/681 |

* cited by examiner

*Primary Examiner* — Boris Chervinsky

(57) ABSTRACT

Disclosed is a docking station mountable in an environment such as a vehicle. The docking station is configured to accept a computerized tablet and to provide to such tablet a power source for operation and recharging of the tablet. Also disclosed is a docking station configured for communicating with the tablet for disseminating the data, video and/or audio content of the tablet to other receivers, such as headphones or vehicle audio system. Similarly, other appliances, such as a channel controller, gaming controller, mouse of a keyboard, may be configured to control the tablet while it is docked. The docking station is configured to allow the user to position the tablet for optimal viewing.

33 Claims, 3 Drawing Sheets

DOCKING STATION

I. RELATION TO OTHER APPLICATIONS

This application is related to and claims priority from U.S. Provisional Patent Application Ser. No. 61/327,620; filed Apr. 23, 2010, entitled "DOCKING STATION," which is fully incorporated herein by reference.

II. FIELD

The present disclosure is generally related to the docking stations for computerized tablets, such as the iPAD® tablet.

III. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), paging devices, and computerized tablets that are small, lightweight, and easily carried by users. Computerized tablets are a more recent addition to the personal computing devices. Computerized tablets allow the user to carry a portable device with a screen and user interface larger than a mobile phone, yet lighter than a laptop computer. Often computerized tablets are a gateway to business applications, the internet, documents, as well as a source for storage, distribution and editing of personal entertainment such as movies, music, photos, videos and gaming. Because they are portable, tablets are commonly powered either by wall power or battery power, with a power input for periodic recharging. Tablets also have common video, audio and/or integrated interfaces, such as RCA ports, HDMI ports, USB ports and in some cases specialized ports, as in the case of Apple® brand products (proprietary 30-pin connector).

Also in the last several years vehicles have incorporated video appliances, such as DVD players. Such players typically have a source drive for the DVD disk and one or more displays that are commonly adapted for headrests or as an overhead display. Passengers view or listen to the content as the vehicle is in motion. Disclosed are a number of embodiments for mounting a computerized tablet in a vehicle. In its mounted position, the tablet is viewable and controllable by one or more users. Moreover, the housing is configured to provide power to the tablet for recharging of its batteries and for its interfaces.

IV. SUMMARY

In one embodiment, the housing comprises a clam-like structure with a mountable first member and a hinge, hinging a second member to the first member or in another embodiment directly to the hinge connected to the surface and without a first member. In this embodiment, the first member is mounted or attached to the roof of a vehicle or a surface (in any environment not limited to vehicles). In this embodiment the first member is joined with the second member in a clam-like arrangement via a hinge or a joint that allows the second member to open about the hinge or joint with respect to the first member. The second member is generally configured to the physical dimensions of the tablet with a retaining mechanism to maintain it about the second member and with functional and electrical connections coupling tablet's data, audio, video and communication capabilities to the surrounding appliances. For example, the audio functionality of the tablet may be coupled to the audio system of the environment, such as an audio system of a vehicle. In one example the tablet directly transmits or communicates its audio content to an infrared or Bluetooth® transmitter configured about the first or second member of the housing, which in turns transmits it to Bluetooth® or infrared enabled headphones and/or audio system. Additionally, the housing may have a power source for the tablet, so that the tablet may recharge or not consume its battery power while in the housing. The pivot characteristics of the housing allow the user to position or orient the display of the tablet.

Yet in another embodiment, the housing comprises a pivotal anchor along with a second member and electrical/functional connectors for the tablet and absent the first member. In this embodiment the anchor is directly mounted to a point in the surrounding environment and allows the user to orient the tablet in different positions for optimal viewing. As above, in this embodiment, the housing comprises data, audio and video connections to allow the tablet to communicate and receive instructions to and from the appliances in its environment. Thus some examples of such communications allow one to listen to the audio content stored on the tablet through an an audio system or headphones; control the tablet vis-à-vis a keyboard, mouse or gaming device; or allow the user to view photographs or watch video. (Subsets and supersets of such capabilities are applicable to all embodiments described in this specification.)

In another embodiment the housing additionally incorporates audio controls or user convenience controls about the vehicle, such as the audio system of the vehicle, climate control or dome lights about the cabin. Accordingly, the user may control the radio settings or content selection, audio control and user convenience controls from the controls positioned at the housing.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
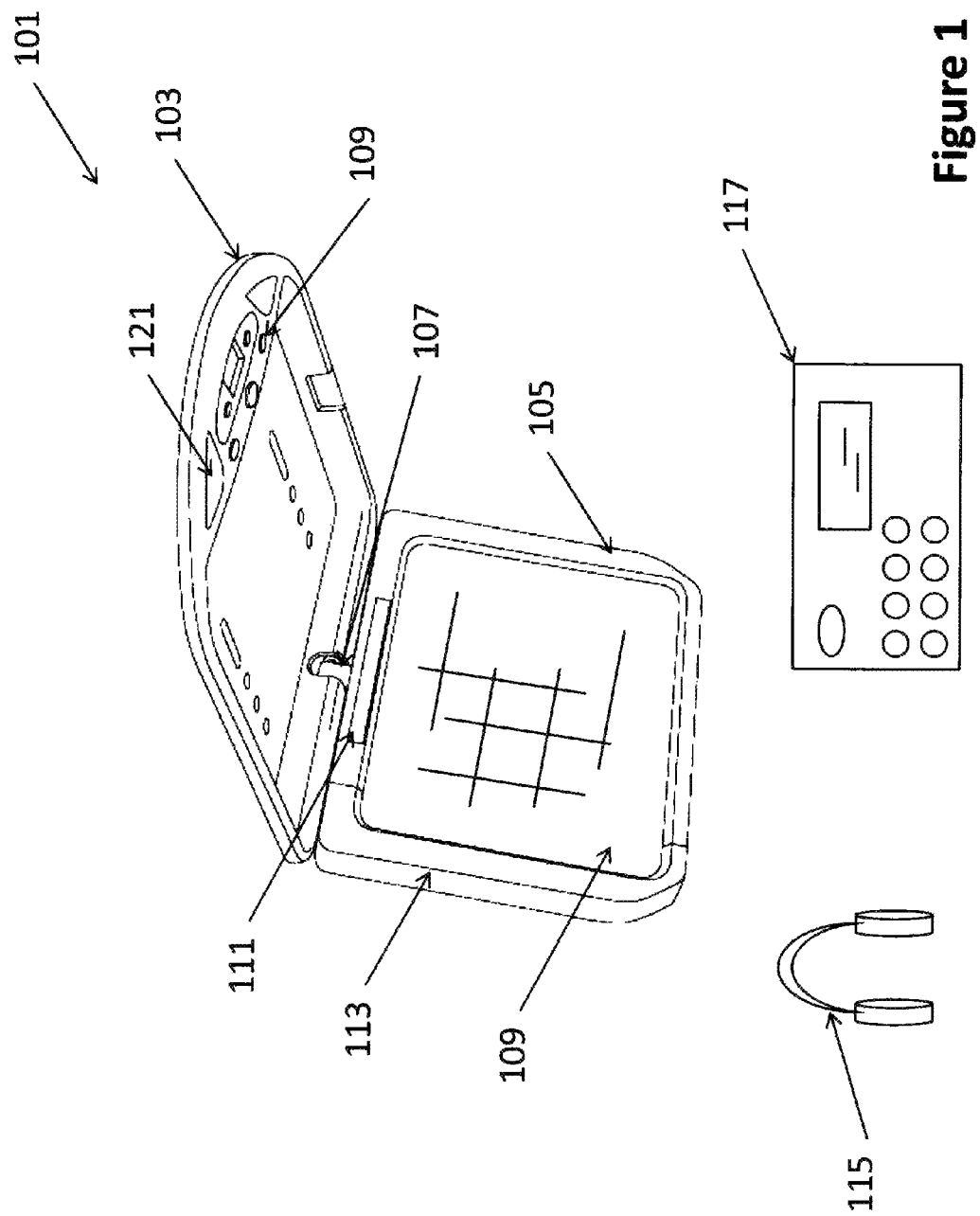
FIG. 1 is an illustration of one of the embodiments of the docking station.
Figure 3:
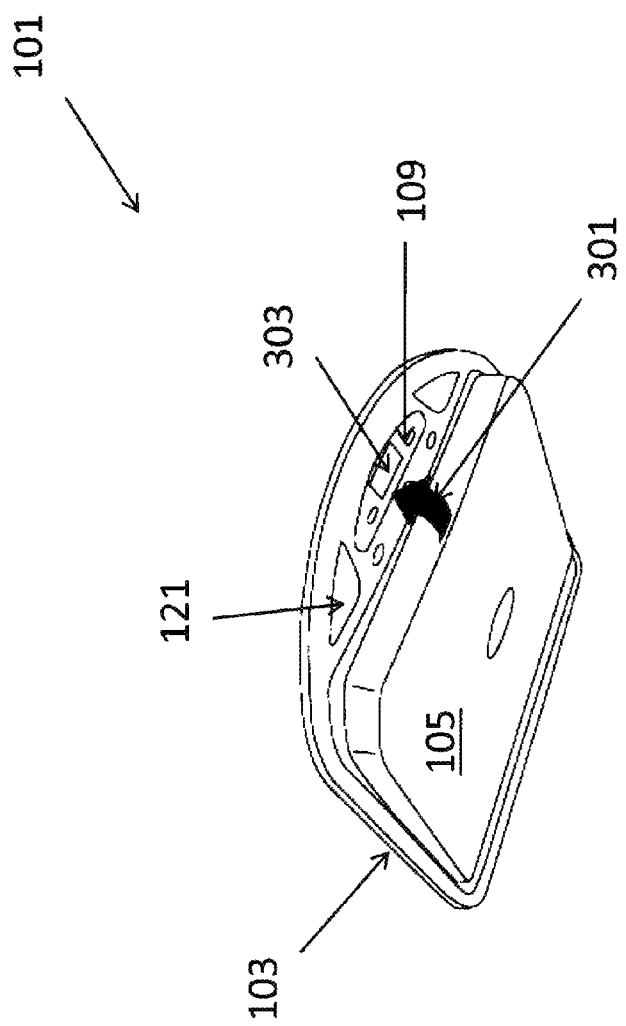
FIG. 3 is an illustration of the docking station in its closed position.

Referring to FIG. 1, a particular illustrative embodiment of a docking station (housing) 101 is presented. In this embodiment, housing 101 comprises a clam like structure configured to accept and house a computerized tablet 221. First member 103 of housing 101 is configured for mounting about a surface or supporting medium such as the roof of a vehicle. At one of its sides, first member 103 incorporates a hinge 107 connecting the first member 103 with a second member 105. In this embodiment parameters of the first member 103 and of the second member 105 are generally configured to match or cooperate, so that the two members fold or join together in a closed position, as shown in FIG. 3.

Hinge 107 allows the user to either open or close second member 105 with respect to first member 103. Hinge 107 is also configured to swivel or pivot thereby allowing the user to orient the second member 105 to perfect or orient the surface of second member 105 and, as will be subsequently described, the screen or display of a computerized tablet 221 housed by the second member 105 for optimal viewing.

As shown in FIG. 1, in one embodiment, one or more controls 109 allow the user to operate and control an audio system 117 that may be present in the surrounding environment, such as the vehicle audio system, by providing control of the input settings, station tuning and other typical audio functionality. Similarly, controls 109 could operate doors, security functionality, climate control or any other electronically controllable functionality of the environment in which housing 101 is employed, such as a vehicle. To achieve this functionality, the housing 101 is wired or configured wirelessly to couple to the control system or independent functions surrounding it. For example, housing 101 could be coupled to a vehicle's data/control bus. In another example, housing 101 could be specifically wired to a particular function, such as opening or closing of door(s) of controlling the lights.

Yet in another embodiment housing 101 may incorporate one or more lights 121. This is useful because when mounted in a vehicle, housing 101 is typically mounted about the central area of the vehicle's roof, where vehicles employ light fixtures. By placing the housing 101 in this space, one is able to position the housing 101 and employ the wiring or harnesses that may be in place in this area. Dome lights 121 provide for illumination on users' demand, standing in or adding to a light fixture that is potentially removed in the installation of housing 101.

Figure 2:
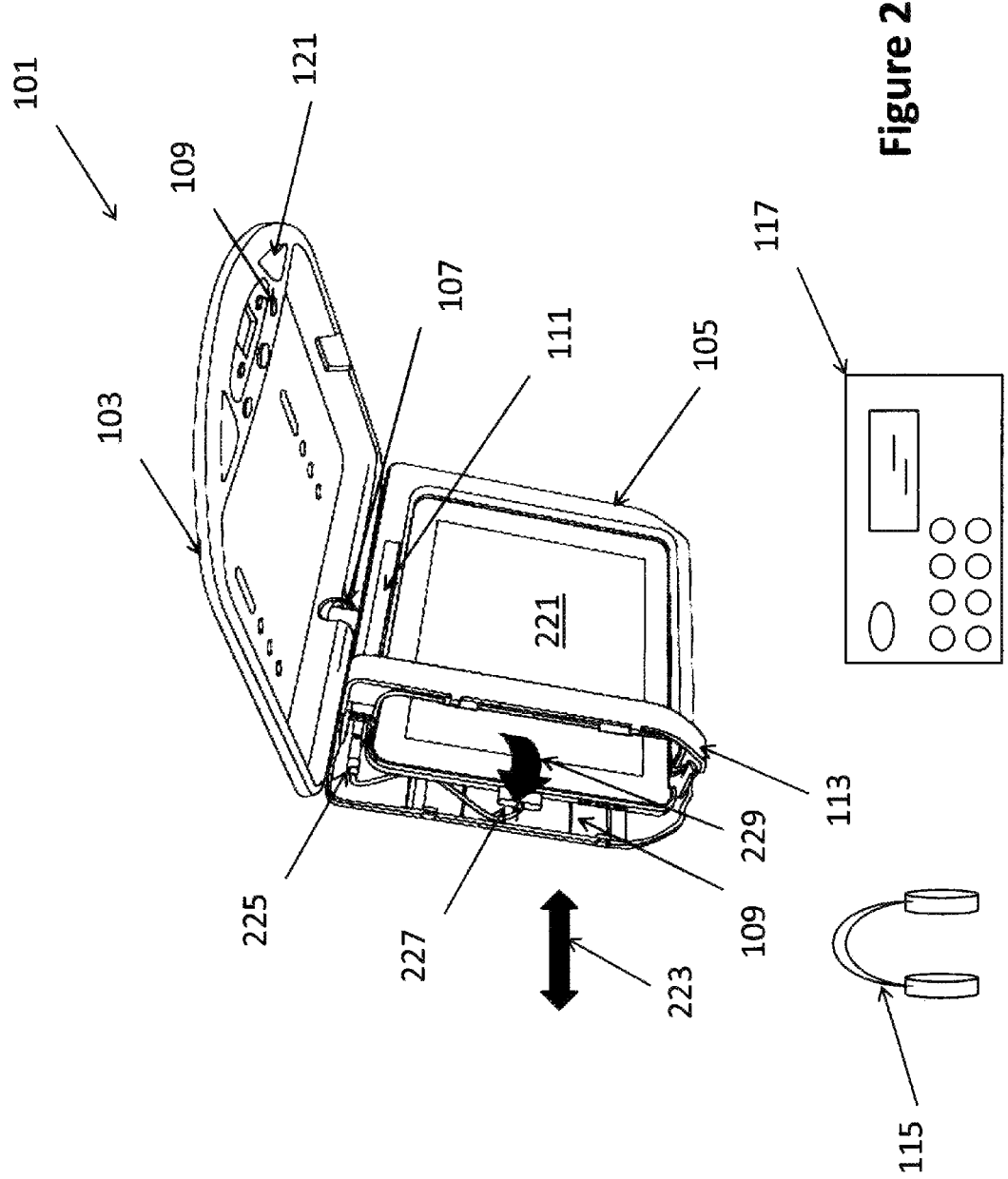
FIG. 2 is an illustration showing means for placing a tablet into the docking station and power and functional connections between the tablet and the docking station.

FIG. 2, illustrates the placement of a computerized tablet 221 in the second member 105. To facilitate the placement, in one embodiment second member 105 incorporates a hinged section 113 that opens the space defined in the second member 105 to accommodate the tablet 221. As illustrated, second member 105 is designed to the dimensions of a tablet 221, such as the iPAD® brand computerized tablet. Tablet 221 is inserted or removed into and from the open member 105 in the direction illustrated by arrow 223. The hinged section 113 is opened and closed as illustrated by arrow 229, thus opening and subsequently closing second member 105 of housing 101 for positioning and securing of tablet 221. The user can leave the tablet in the housing 101 or selectively remove it by opening the hinged section 113 in the opposite direction of arrow 229, disconnecting the tablet 221 and sliding it out.

Notably, housing 101 is configured for providing power to the tablet 221 via power connection 225. In this embodiment, housing 101 is connected to a power source, such as the vehicle power and power is conditioned to accommodate the power requirements of the tablet 221. Accordingly, tablet 221 recharges and/or consumes its power from the vehicle's power source while in the housing 101.

Moreover, housing 101 employs an input/output connector 227 that mates to the tablet 221. This allows the control and transfer of data/content to and from the tablet to appliances, accessories and systems that are in the vicinity of the tablet 221. For example, audio content from the tablet 221 can be transferred through ports of the tablet such as connector 227, which is in this illustrated example is a proprietary 30-pin connector employed by Apple for its iPAD tablets 221. Such ports may be proprietary or standard, such as USB ports, as one example. Such data and/or content is transferred to housing 101 and coupled to transmitter or transceiver such as an infrared transmitter or a Bluetooth® transceiver, illustrated in FIGS. 1 and 2 as block 111; or as the application may require, to other systems in the environment in which the tablet 221 is in. Accordingly, in one embodiment, by way of example, the audio content from tablet 221 is coupled to infrared transmitter 111 via cable/connector 227 and in turn, the infrared transmitter 111 transmits the content to headphones 115 or vehicle audio system 117. Similarly, one could use the interactive functionality of the tablet 221 with a mouse, keyboard, gaming controllers, or other controls while the tablet 221 is in the housing 101. In instances where the tablet 221 does not have wireless transceiver capabilities, transceiver 111 of the housing 101 may be employed to relay the data/information/control to tablet 221 via, its I/O port and cable/connector 227.

FIG. 3 illustrates that the second member 105 of the housing 101 can be stowed away into or moved into conjunction with first member 103. Accordingly, when not in use, the second member 105 is placed out of the way by moving it toward the first member 103. Notably, the dimensions of the first member 103, in this embodiment, are configured slightly in excess of the parameters of the second member 105 in order to accommodate the second member 105 within the first member 103, or vice versa. Moreover, the first member 103 is configured to additionally accommodate controls 109, lights 121 and a display 303. Display 303 maybe a status, LED, LCD or any other display or indicator. In one embodiment it displays the frequency of the radio station or the content designation such as the CD or DVD volume that is in play.

Yet in another embodiment one may employ a hinge that does not require the first of the two members 103. In this embodiment second member 105 is attached to such hinge, which in turn is attached to a surface and therefore may be configured to selectably clam open and closed with respect to a surface, such as the roof of a vehicle or about the anchor point. Such embodiment allows the user to orient the display of the tablet 221 in a number of directions and among a number of useful positions, to rotate or pivot about the hinge from side to side, to optimize the viewing angle for the users. Such docking station may employ all of the aforementioned functionality and features and place controls 109 and/or lighting 121 about the second member 105 or generally in the vicinity of housing 101.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

It should be further understood that although the present disclosure and its advantages have been described in detail, various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the aft will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope.

I claim:

1. A docking station for a computerized tablet comprising:
a housing further comprising of a hinge, a first member and a second member;
said second member adapted for receipt of a computerized tablet and movement about said first member via the hinge, allowing said second member to descend and swivel with respect to said first member in at least two directions for viewing by a user;
a transmitter coupled to said housing and said tablet for transmitting or receiving at least one of data, audio and video content from said tablet to at least one of data, audio and video receiver;
said housing further comprising an interface compatible with said tablet for coupling a power input of said tablet with a power source from said vehicle for operating and recharging of said tablet.

2. The docking station of claim 1 wherein said interface further facilitates communication of said at least one of data, audio and video content from said tablet to at least one of control, data, audio and video receiver outside of said docking station.

3. The clocking station of claim 1 further comprising at least one control for controlling at least one accessory of said vehicle.

4. The docking station of claim 3 wherein said at least one accessory is selected from the group consisting of audio controls, video controls, vehicle lighting controls, data controls, climate controls, vehicle access control, vehicle security control and light controls.

5. The docking station of claim 1 further comprising a light source for illuminating an area about said housing.

6. The docking station of claim 1 wherein said transmitter is an infrared transmitter for transmitting said at least one of data, audio and video content from said tablet.

7. The docking station of claim 1 wherein said second member comprises a bracket spaced apart from a back portion of said second member thereby defining a space and a parameter configured to accommodate said tablet; and at least one of said back portion and said bracket further configured to allow insertion of said tablet in said space.

8. The docking station of claim 7 wherein said bracket further comprises a hinged portion allowing the insertion of said tablet into said space.

9. A docking station for a computerized tablet comprising:
a housing further comprising of a hinge means connecting a first member means and second member means;
said second member means adapted for receipt of a computerized tablet and connected to said first member means via said hinge means for pivotal movement of said second member means about said first member means and for allowing said second member means to descend and swivel with respect to said first member in at least two directions;
a transmitter means coupled to said housing and said tablet for transmitting or receiving at least one of data; audio and video content from said tablet to at least one of data, audio and video receiver means;
said housing further comprising an interface means, compatible with said tablet, for coupling a power input of said tablet with a means for providing power from said vehicle for operating and recharging of said tablet.

10. The docking station of claim 9 wherein said interface means further facilitates communication of said at least one of control, data, audio and video content from said tablet to at least one of data, audio and video receiver outside of said docking station.

11. The docking station of claim 9 further comprising at least one control means for controlling at least one accessory of said vehicle.

12. The docking station of claim 11 wherein said at least one accessory is selected from the group consisting of audio controls, video controls, vehicle lighting controls, data controls, climate controls, vehicle access control, vehicle security control and light controls.

13. The docking station of claim 9 further comprising a light source means for illuminating ah area about said housing.

14. The docking station of claim 9 wherein said transmitter means comprises an infrared transmitter means for transmitting said at least one of data, audio and video content from said tablet.

15. The docking station of claim 9 wherein said second member means comprises a bracket means spaced apart from a back portion means of said second member means for defining a space and a parameter configured to accommodate said tablet; and at least one of said back portion means and said bracket means further configured for allowing insertion of said tablet in said space.

16. The docking station of claim 15 wherein said bracket means further comprises a hinged portion means for allowing the insertion of said tablet into said space.

17. A docking station for a computerized tablet comprising:
a housing further comprising of a hinge connecting a first and second members;
said second member adapted for receipt of a computerized tablet and pivotal movement about said first member via said hinge, allowing said second member to descend and swivel with respect to said first member in at least two directions;
at least one of a receiver coupled to said housing and said tablet for receiving at least one of control, data, audio and video content from at least one transmitter;
said housing further comprising an interface compatible with said tablet for coupling a power input of said tablet with a power source from said vehicle for operating and recharging of said tablet.

18. The docking station of claim 17 wherein said interface further facilitates coupling of said at least one of control, data, audio and video content to said tablet from at least one of data, audio and video transmitter outside of said docking station for communication between said tablet and said transmitter.

19. The docking station of claim 17 further comprising at least one control means for controlling at least one accessory of said vehicle.

20. The docking station of claim 19 wherein said at least one accessory is selected from the group consisting of audio controls, video controls, vehicle lighting controls, data controls, climate controls, vehicle access control, vehicle security control and light controls.

21. The docking station of claim 17 further comprising a light source for illuminating an area about said housing.

22. The docking station of claim 17 wherein said transmitter is an infrared transmitter for transmitting said at least one of data, audio and video content from said tablet.

23. The docking station of claim 17 wherein said second member comprises a bracket spaced apart from a back portion of said second member thereby defining a space and a parameter configured to accommodate said tablet; and at least one of said back portion and said bracket further configured to allow insertion of said tablet in said space.

24. The docking station of claim 23 wherein said bracket further comprises a hinged portion allowing the insertion of said tablet into said space.

25. A docking station for a computerized tablet comprising:
- a housing further comprising of a hinge means connecting a first member means and second members means;
- said second member means adapted for receipt of a computerized tablet and connected to said first member via said hinge means for pivotal movement about said first member means and for allowing said second member means to descend and swivel with respect to said first member means in at least two directions;
- a receiver means coupled to said housing and said tablet for receiving at least one of control, data, audio and video content from at least one transmitter means;
- said housing further comprising an interface mean with said tablet for coupling a power input of said tablet with a power source from said vehicle for operating and recharging of said tablet.

26. The docking station of claim 25 wherein said interface means further facilitates coupling of said at least one of control, data, audio and video content to said tablet from at least one of data, audio and video transmitter means outside of said docking station for communication between said tablet and said transmitter.

27. The docking station of claim 25 further comprising at least one control means for controlling at least one accessory of said vehicle.

28. The docking station of claim 27 wherein said at least one accessory is selected from the group consisting of audio controls, video controls, vehicle lighting controls, data controls, climate controls, vehicle access control, vehicle security control and light controls.

29. The docking station of claim 25 further comprising a light means for illuminating an area about said housing.

30. The docking station of claim 25 wherein said transmitter means is an infrared transmitter for transmitting said at least one of data, audio and video content from said tablet.

31. The docking station of claim 25 wherein said second member means comprises a bracket means spaced apart from a pack portion means of said second member means for defining a space and a parameter configured to accommodate said tablet; and at least one of said back portion means and said bracket means further configured for allowing insertion of said tablet in said space.

32. The docking station of claim 31 wherein said bracket means further comprises a hinged portion means allowing the insertion of said tablet into said space.

33. A docking station for a computerized tablet comprising:
- a housing further comprising a hinge connected to a retaining member;
- said retaining member configured for receipt of a computerized tablet and pivotal movement about said hinge, allowing said retaining member to descend and swivel in at least two directions with respect to a mounting surface;
- at least one of a transmitter and a receiver coupled to said retaining member and said tablet for at least one of receiving data and control from an appliance and communicating at least one of data, audio and video content from said tablet to, at least one of data, audio and video receiver;
- said retaining member further comprising an interface compatible with said tablet for coupling a power input of said tablet with a power source from said vehicle for operating and recharging of said tablet.

* * * * *